United States Patent [19]

Domenighetti et al.

[11] Patent Number: 5,009,546
[45] Date of Patent: Apr. 23, 1991

[54] ROAD PAVER-FINISHER WITH A COMBINATION OF AXLES WITH STEERING WHEELS AND CRAWLER UNITS

[76] Inventors: Domenico Domenighetti, Via Calli, 8, CH-6900, Switzerland; Jack Layton, 4725 Turner Rd., SE., Salem, Oreg. 97301

[21] Appl. No.: 299,826
[22] PCT Filed: Apr. 10, 1987
[86] PCT No.: PCT/EP87/00197
   § 371 Date: Feb. 8, 1989
   § 102(e) Date: Feb. 8, 1989
[87] PCT Pub. No.: WO88/08054
   PCT Pub. Date: Oct. 20, 1988
[51] Int. Cl.$^5$ ............................................. E01C 19/18
[52] U.S. Cl. ........................................ 404/110; 404/84
[58] Field of Search ............... 404/110, 108, 83, 84; 180/6.62, 6.7, 7.1, 9.28, 9.94

[56] References Cited

U.S. PATENT DOCUMENTS

| | | | |
|---|---|---|---|
| 1,729,374 | 9/1929 | Ehrhart | 180/9.28 |
| 2,875,839 | 3/1959 | Spinks, Jr. | 180/9.4 |
| 3,054,334 | 9/1962 | Barber et al. | 404/108 |
| 3,674,094 | 7/1972 | Kuntz | 404/84 |
| 4,204,583 | 5/1980 | Toyoura et al. | 180/9.28 |
| 4,657,099 | 4/1987 | Boltensperger | 180/9.28 |
| 4,682,908 | 7/1987 | Domenighetti | 404/84 |
| 4,801,218 | 1/1989 | Musil | 404/84 |
| 4,821,824 | 4/1989 | Gilbert | 180/9.28 |
| 4,836,564 | 6/1989 | Heims | 280/6.12 |

FOREIGN PATENT DOCUMENTS

| | | |
|---|---|---|
| 3424979 | 1/1986 | Fed. Rep. of Germany . |
| 2489232 | 3/1982 | France . |
| 445718 | 12/1974 | U.S.S.R. . |
| 645887 | 2/1979 | U.S.S.R. . |
| 1372272 | 10/1974 | United Kingdom . |

Primary Examiner—Ramon S. Britts
Assistant Examiner—Gay Ann Spahn
Attorney, Agent, or Firm—Young & Thompson

[57] ABSTRACT

A road paver-finisher having a tractor unit and a screed unit mounted for vertical movement on and relative to the tractor unit. The tractor unit has a hopper for road material, and conveyors unload the road material from the hopper in front of the screed to be leveled by the screed. Crawler belts mounted on the tractor unit are disposed forwardly of the screed for advancing the tractor unit, and ground engaging steering wheels are mounted on the tractor unit forwardly of the crawler belts. Power devices are provided for moving the steering wheels and crawler belts vertically relative to each other thereby to control tilting of the tractor unit and hence of the screed. These power devices can move the steering wheels vertically relative to the crawler belts, or vice versa.

7 Claims, 8 Drawing Sheets

ROAD PAVER-FINISHER WITH A COMBINATION OF AXLES WITH STEERING WHEELS AND CRAWLER UNITS

DESCRIPTION OF THE STATE OF THE ART

A machine used for laying down layers of materials for paving roads, airports, etc. is commonly called a "road-paver-finisher".

The materials to be laid down (generally mineral aggregates mixed with asphalt, bitumen, cement or other binders to form conglomerates, stabilized soils or the like) must be finished off to form a quite levelled and compacted layer.

To attain the latter object, the "paver-finisher" is usually provided with vibrating or beating ("tamping") members and therefore is often referred as "vibro-finisher" or "vibro-paver".

The function of levelling, compacting, densifying and smoothing the materials to form a layer ("carpet") is of utmost importance. A levelling-tamping member of the paver, called a "screed" performs this function.

Depending on the principle by which the screed provides for minimizing the waves on the finished carpet, the pavers can be divided in two classes, namely pavers with a "semi-floating" screed and pavers with a "full-floating" screed.

The pavers with a semi-floating screed are used in small and medium sized jobs and are therefore highly diffused.

Pavers with a full-floating screed are used on large jobs or in connection with so called "slip-form-paving".

The following description of the invention is referred to pavers with a semi-floating screed, but can as well be adopted on pavers with full-floating screeds.

A paver of the more common type, that is a semi-floating screed paver is formed by the combination of two basic units:
The "tractor unit" or "prime mover",
The "semi-floating" screed.

Following the semi-floating principle, the screed is a more or less complicated transverse member that is pulled by two long arms that are pivotally mounted on the tractor unit.

The transverse member itself engages with the material to be laid, "smearing" it on the old road surface, compacting and smoothing it to form an even carpet without waves.

The "tractor unit" is the main body of the paver and comprises many members that are not directly connected with the tractor-unit's main function, that is that of imparting the forward motion to the whole machine and to pull or tow the screed.

Other important functions performed by members belonging to the tractor unit are:
Receiving (from rear dump trucks) the material mix and stocking it.
Handling said mix (moving it longitudinally, transversely, up and down) in order to feed it in the most suitable way to the screed for best levelling and compacting action.

The paver-finishers of known type are described in some of the accompanying drawings, wherein:

FIG. 1 shows a bird's eye view of a typical semi-floating-screed paver having the tractor unit mounted on rubber tired wheels, FIG. 1a shows a bird's eye view of a typical semi-floating-screed paver having the tractor unit mounted on crawlers, FIG. 2 shows a side view of the wheel mounted paver of FIG. 1, FIG. 3 shows the paver of FIG. 2 with detached screed:

The two towing arms of the screed have been disconnected from their mounting on the tractor unit and the whole screed unit has been displaced rearwards to show freely the complete tractor unit.

A "State of the Art" paver-finisher in FIGS. 1, 2 and 3 comprises a tractor unit (10) and a screed (11).

The tractor unit (10) comprises a main frame (12) a hopper (13) for receiving the material mix from rear dump trucks, one or more conveyors (14) and augers (15) providing the adequate flow of material mix towards the screed (11).

The main frame (12) of the tractor unit (10) is provided with traction wheels (12') and with steering wheels (12") (or with crawler tracks (12''')) for the purpose of self-propelling the whole machine.

The screed (11) is provided with towing arms (16) that are pivotally mounted at their front end (17) to the main frame (12) of the tractor unit (10).

The geometrical position of the mounting point (18) of the screed arm front end (17) on the tractor unit's main frame (12) is of utmost importance for achieving the best possible levelling action of the screed (11).

In fact, the wheels (12') and (12") of the tractor unit (10) during the forward motion of the paver, are bound to follow the waves of the ground, imparting thus to the whole tractor unit (10) swinging motions that should not be transmitted to the screed (11).

In order to reduce somehow the up and down motion of the tractor unit (10) when the steering wheels (12") meet a wave or an obstacle on the ground, the two wheels (12") that lie approximately on the same vertical, longitudinal plane are mounted on a mechanically swivelling arm (12a) called a "cantilever arm" which is pivotally mounted on a pivot (12b) welded to the paver's main frame (12).

(Crawler mounted tractor units behave even worse than wheel mounted ones, that is if the crawler unit meets a bump it walks over it, imparting to the tractor unit an upward motion of very long wave-length).

In order to reduce a minimum the transmission of up and down motions to the screed (11), the position of the point (18) is usually chosen at half the length of the tractor unit wheel-base.

At present the world population of paver-finishers is divided into two groups of approximately the same size: one group comprising pavers with a crawler mounted tractor units and the other group comprising pavers with a (rubber tired) wheel mounted tractor units.

The crawler mounted pavers have very good TRACTION and FLOTATION on soft soil, but very poor maneuverability and travel speed.

The tired mounted pavers having high travel SPEED and ease of steering, but rather poor traction and flotation on loose soils.

DESCRIPTION OF THE PRESENT INVENTION

The present invention relates to a road paver-finisher comprising a tractor unit and a screed unit.

The tractor unit thereof comprising a hopper, a conveyor system, feeders, augers, a main frame, one or more axles with steering wheels and a crawler unit with a driving sprocket (or wheel), stretcher-wheel, crawler belt and a multitude of supporting rollers.

The combinatoin of (one or more) crawler units and (one or more) steering axles on the very same tractor unit gives to the latter conspicuous advantages that are greater than the mere sum of the technical characteristics of the crawler unit and the steering axles alone.

In fact, if compared to a CRAWLER mounted paver of the known type, the paver of this invention has the following advantages:
More accurate steering and thus higher travel speed.
Longer wheel-base with the same crawler contact line with the ground.
Same traction and flotation on soft soils.

If compared to a WHEEL mounted paver of the known type, the paver manufactured in accordance with this invention has the following advantages:
Better traction and flotation on soft soils.
Same ease of steering and travel speed.
Less swinging (up and down) motion and "rocking-chair" effect.

If compared to BOTH paver finishers of the known type, the paver built following the present invention has the advantage of minimizing the up and down swinging motions of the tractor unit due to the pre-existing waves on the old ground.

In fact the longer overall wheel-base of the combination traction system (steering axles plus crawler unit) and the presence of "voids" between the crawler contact line and the steering wheels, enable this system to "absorb" much better the pre-existing waves of the ground, particularly if said waves are of short wavelength.

This statement can be demonstrated geometrically applying and moving forward on a given uneven ground the geometrical patterns of the known paver tractor units and of the combination tractor unit of this invention.

A more detailed description of the paver-finisher in accordance with the present invention will be given as follows, with the help of the appended drawings.

Figure 4:
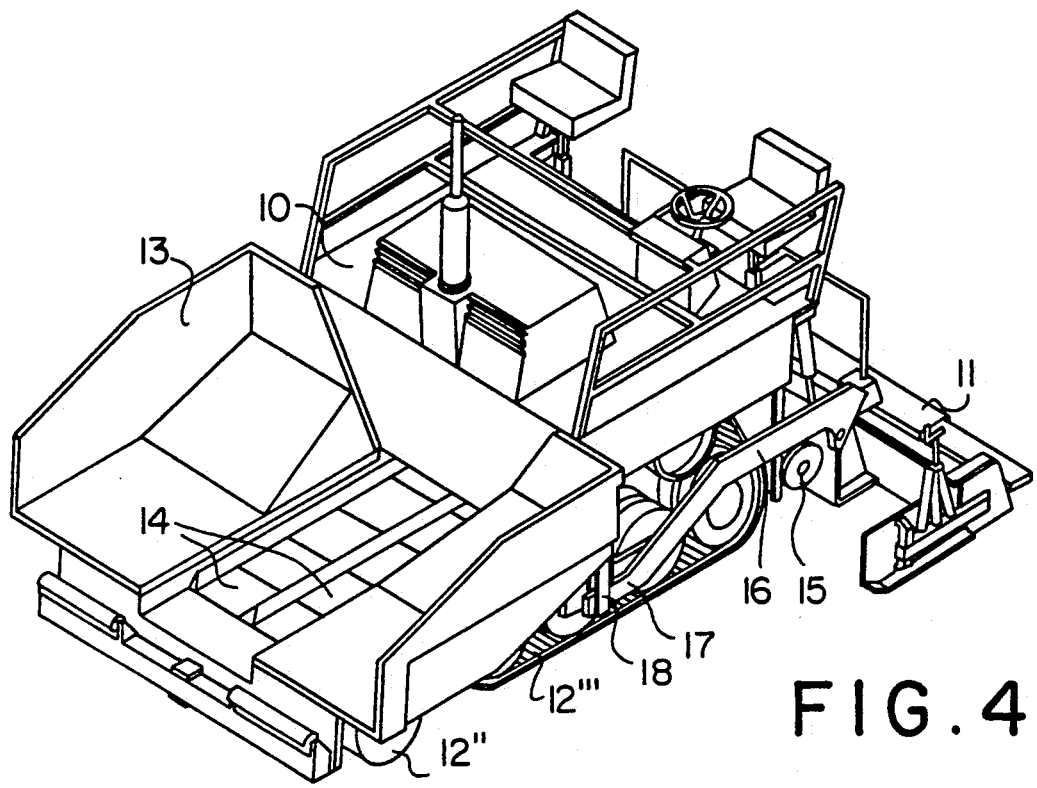
FIG. 4 shows a bird's eye view of a basic version of the paver following this invention, with a simplified crawler-and-axle combination tractor unit.
Figure 5:
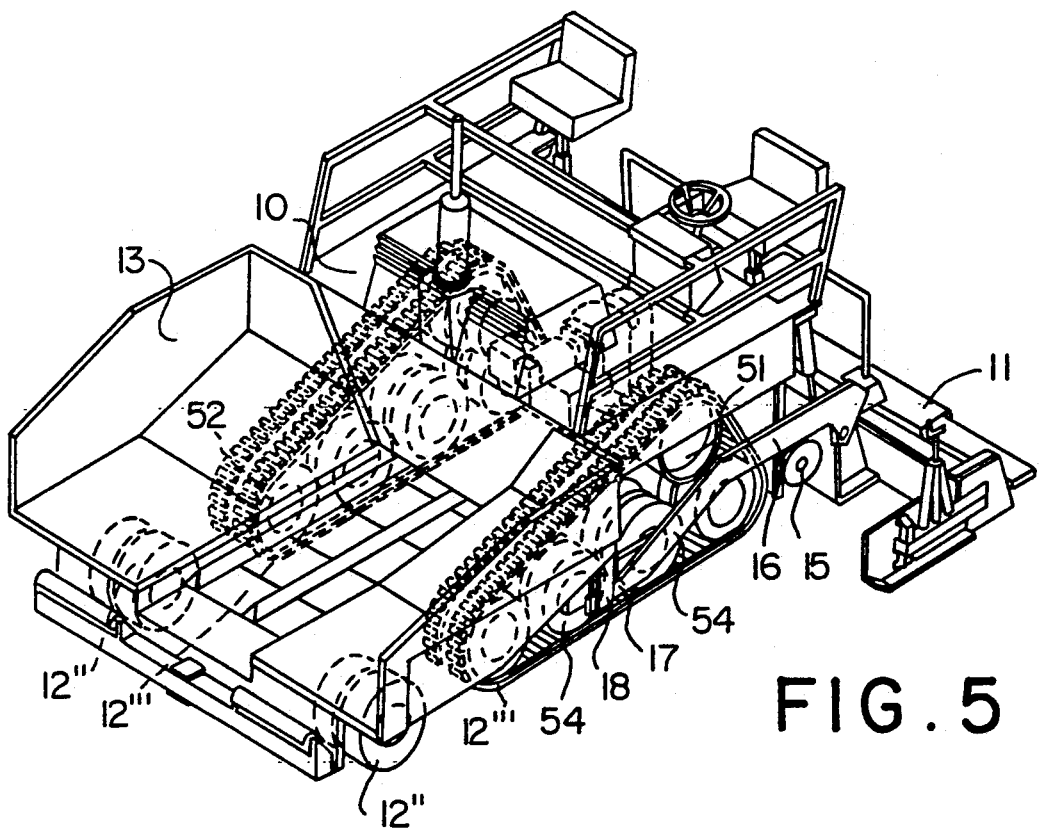
FIG. 5 shows the same paver of FIG. 4, but with some transparent body parts in order to enable the observer to see through them for a better understanding of the combination principle.

A paver-finisher embodying this invention is shown in FIG. 4 and FIG. 5 in a simplified embodiment:

On the front end of the tractor unit (10) is located a big hopper (13), adapted to receive the material mix from rear-dump-trucks.

For best flow control of the material mix, two conveyors (14) are located in the center of the hopper (13) and two augers (15) are located at the rear lower end of the tractor unit (10).

In a mid-size version of the tractor unit (10) there are (on both sides) the connecting points (18) on which the towing-arms-front ends (17) of the screed (11) are pivotally mounted.

The tractor unit (10) travel-carriage is composed of two crawler units (12''') located at the tractor unit's rear end, and a pair of (dual) steering wheels (12'') located on each side of the tractor unit's front end.

In the paver shown, each pair of steering wheels (12'') is mounted separately, one on each side of the tractor unit's main frame (12). The wheel pairs are aligned transversely of the tractor.

The screed (11) is of the extensible type (as described e.g. in the EURO-Patent Application No. 83111356.8 Publ. 0109639) and is towed by means of the towing arms (16) by the tractor unit (10).

Figure 6:
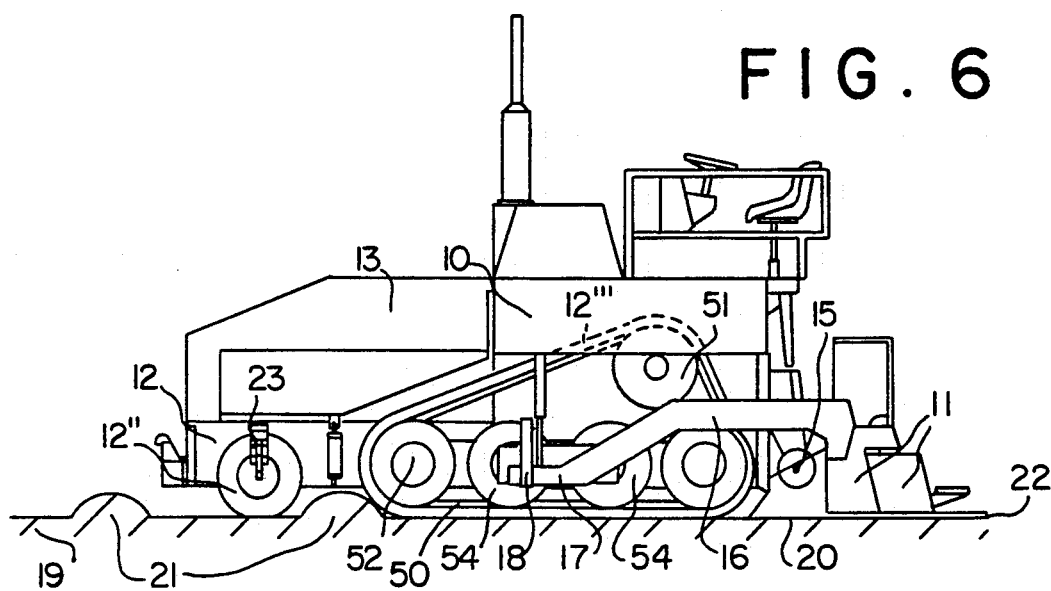
FIG. 6 shows a side view of the same paver of FIGS. 4 and 5.

In FIG. 6 is shown a side view of the paver of FIGS. 4 and 5 with a section of the ground that supports the tractor unit (10) during the paving work and of the finished layer ("carpet") produced by the paver.

Both the front steering wheels (12'') and the crawler units (12''') press on the ground (19) pushing the paver forward.

Said ground (19) is normally bumpy, it being the job of the paver to lay on top of it a "carpet" of material-mix (20) to smoothen the pre-existing waves.

During the work, the tractor unit (10) moves forward and up and down following the bumps (21) of the ground (19).

Since the towing arms (16) of the screed (11) are mounted on the tractor unit's main frame (12), it is desirable that the up and down movements due to the tractor unit's riding on pre-existing bumps are reduced to a minimum.

Of utmost importance is the wavelength of the up and down movements of the tractor unit.

Said wavelength must be the shortest possible in order to prevent the screed (10) from copying or reproducing the bumps (21) of the the ground (19) on the "finished" laid down layer (22).

It is easy to demonstrate, that with a given wheelbase of the tractor unit (10) and a given height and length of the pre-existing bump (21), the combination of one or more steering axles with one or more crawler units induces (in the tractor unit (10)) up and down motions with shortest wavelength (if compared with known systems) and thus there are produced less disturbing waves on the finished layer (22).

The front steering wheels (12'') are mounted on a pivot (23) having a vertical axis, around which the wheels (12'') can rotate for steering. The steering geometry and system of a front end axle for pavers is described in detail in the ITALIAN Patent Application No. 21767-A/85.

In each of the crawler units (12'''), a crawler belt (50) is provided, which is trained over a driving wheel or sprocket (51), a stretcher wheel (52), and plural supporting wheels (54).

Figure 7:
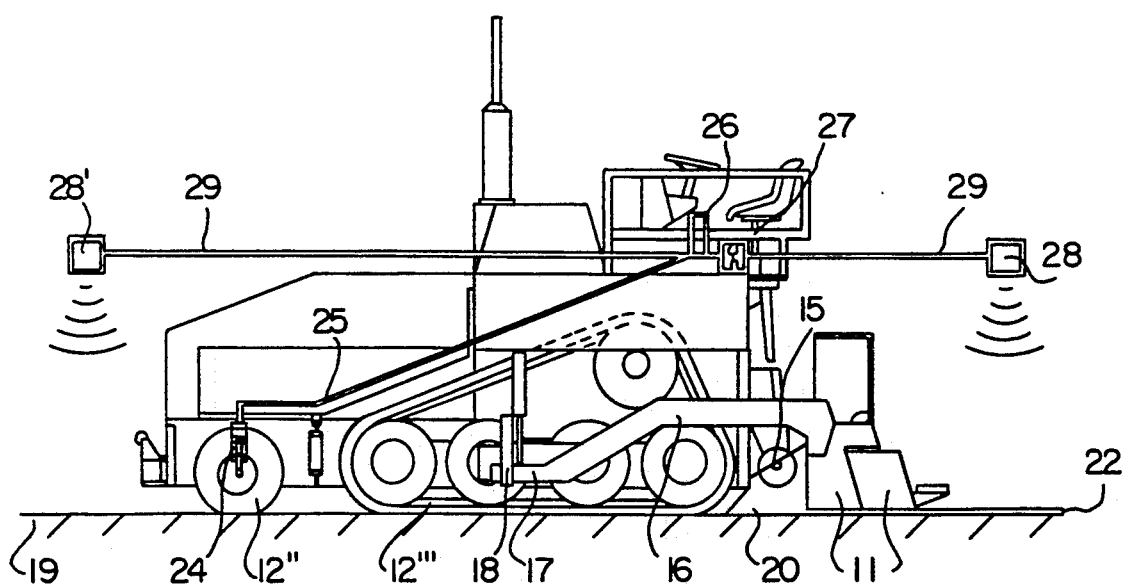
FIG. 7 shows a side view of the paver of FIG. 6 with the addition of a further embodiment of this invention for controlling the weight distribution and the longitudinal and transverse slope of the tractor unit.

In FIG. 7 is shown a side view of a paver similar to that of FIG. 6, that is a paver according to this invention, but including an additional innovative device for the control of the load distribution and the longitudinal and transverse slope angle of the tractor unit (10).

The wheels (12") and the crawler units (12''') on which the tractor unit (10) is mounted are more or less elastic means, that is they yield more or less, following the load that each of them are bound to carry.

When e.g. the front hopper (13) is fully loaded, the center of gravity of the tractor unit (10) is displaced forward. During work the material-mix is used up by the paver and the hopper (13), becomes empty, and so the center of gravity travels backwards.

Because of the elasticity of the wheels (12") and of the crawler units (12''') and also because of some elasticity of the ground (19) itself, the entire body of the tractor unit (10) is bound to tilt when its center of gravity moves forwards and backwards.

This tilting action occurs in a longitudinal plane.

If the rear dump truck does not discharge its load properly in the center of the hopper (13) a transverse tilting action may occur.

Since the screed tow arms (16) are connected by means of their front ends (17) to the points (18) of the tractor unit (10), it is easily understood that each change of slope of the tractor unit (10) induces undesirable movements to the screed (11) and thus induces undesirable waves on the finished layer (22).

The additional device of this invention that enables one controlling all tilting movements of the tractor unit (10) comprises each steering wheel (12") mounted on a substantially vertical sliding guide (34) (see FIG. 7b), an actuator (24) operating substantially vertically on each front wheel (12") to push it downwards against the ground (19) or lift it upwards to reduce the load transmitted by said wheel (12") to said ground (19), a hydraulic circuit (25) to feed with hydraulic oil said actuator (24) (said actuator having e.g. the form of a hydraulic cylinder-piston system), a control box (26) containing valves, distributors, electric circuitry for the control thereof.

The oil pressure in both chambers (41) and (42) of the cylinder (40) (see FIG. 7b) can be controlled by hand acting on a dashboard (31) (see FIG. 7a) of box (26) or can be adjusted automatically by an optional automation. Said automation is a system comprising an electronic pendulum (27), distance measuring sensors (28) and (28') and electric circuitry (29) for connecting said devices with each other and with the main control box (26).

Figure 7A:
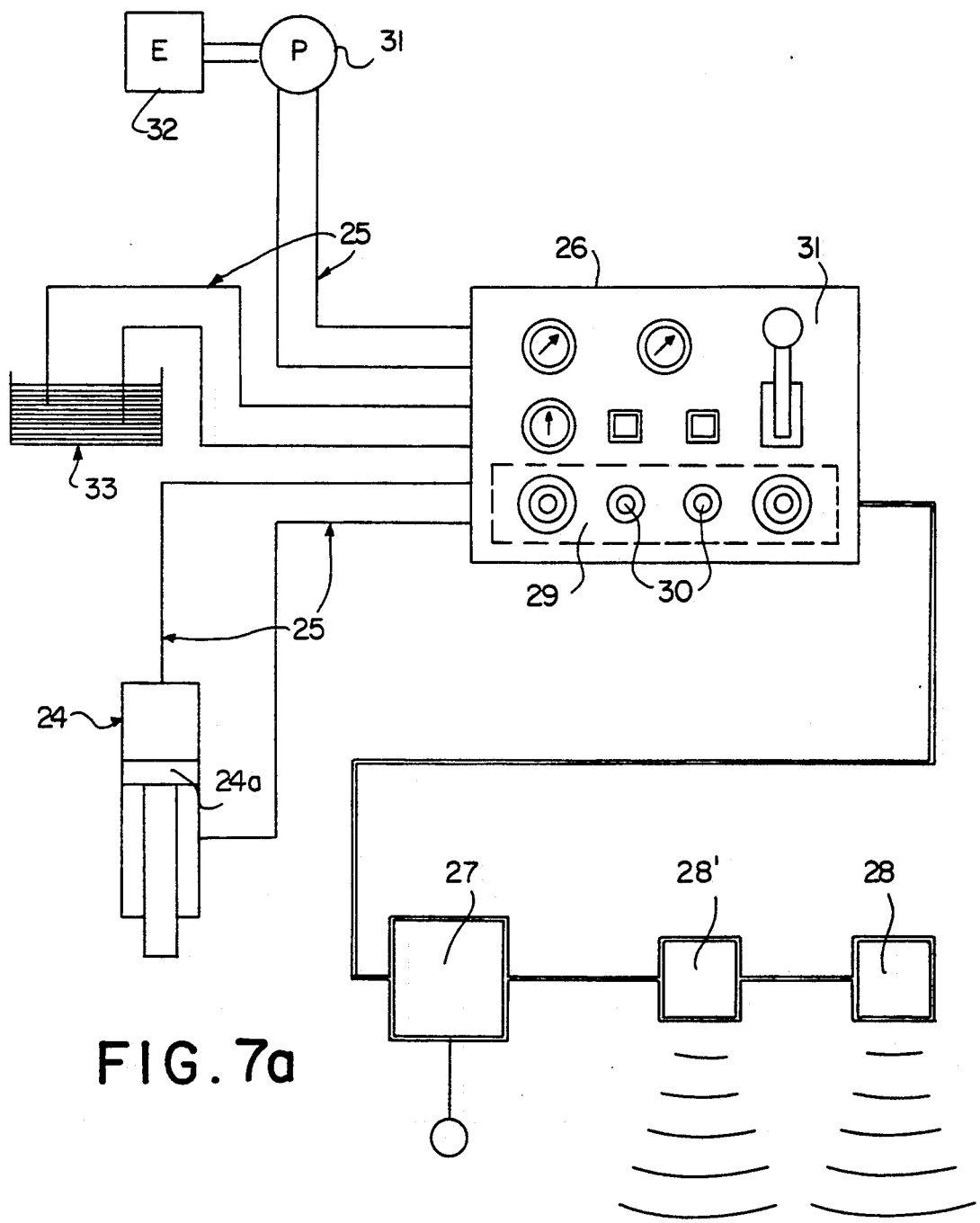
FIG. 7a shows an outline of the automatic system that enables said control.

FIG. 7a shows schematically said automation and the main members to which it is connected.

Inside said box (26) is provided a comparator (29) for evaluating the data received from said pendulum (27), and from said sensors (28) and (28') and converting them into control impulses to the hydraulic circuit (25) and finally to the hydraulic cylinder (24).

As an example, said sensors (28) and (28') can be of the sonic or ultrasonic type.

The operator of the paver can adjust said comparator (29) (by manipulating the knobs (30) on the dashboard (31) of said control box (26)) in order to prearrange the desired longitudinal and transverse slope to be maintained automatically during work by the tractor unit (10).

The hydraulic system connected to said automation comprises a pump (31) driven by the paver's main engine (32), an oil tank (33), a hydraulic actuator (24) (cylinder 24 with piston 24a) and a series of hydraulic pipes, flexible tubes etc. to form hydraulic circuitry (25).

Figure 7B:
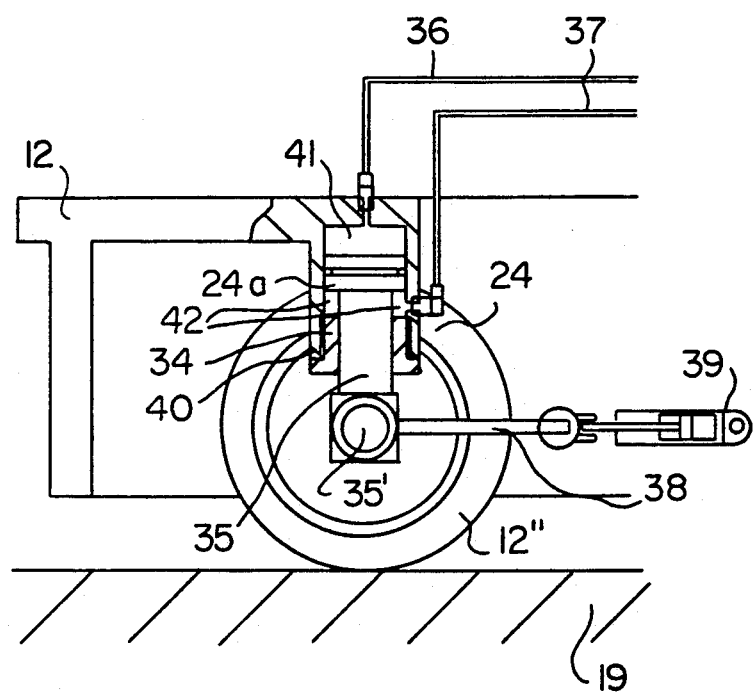
FIG. 7b shows an embodiment of the actuator that controls the up and down movement of the steering wheel (12").

FIG. 7b shows an example of an embodiment of this invention referring to the actuating system for pressing down or lifting up one of the steering wheels (12") in order to vary the load transmitted by said wheel (12") to the ground (19).

Following this example of the embodiment, the steering wheel (12") is mounted on a stub axle (35') forming one solid body with the rod (35) of the actuator (24).

The latter comprises a cylinder (40), a piston (24a) a long bushing (34) in which the rod (35) can rotate and slide.

The piston (24a) and the cylinder (40) form an upper chamber (41) and a lower chamber (42) into which the hydraulic oil can be injected alternatively by means of the pipes (36) and (37) of the hydraulic circuit (25).

If the hydraulic oil pressure in the upper chamber (41) is higher than the hydraulic oil pressure in the lower chamber (42), then the steering wheel (12") is pushed against the ground (19).

If the hydraulic oil pressure in the lower chamber (42) is higher than hydraulic oil pressure in the upper chamber (41), then the steering wheel (12") is lifted, thus reducing the share of the load transmitted by the steering wheel to the ground (19).

The steering, that is the rotation (around a vertical axis) of the steering wheel (12") is obtained by the actuator (39) (a hydraulic ram of known type) exerting a pushing or pulling force on the lever (38) of the stub axle (35').

Figure 8:
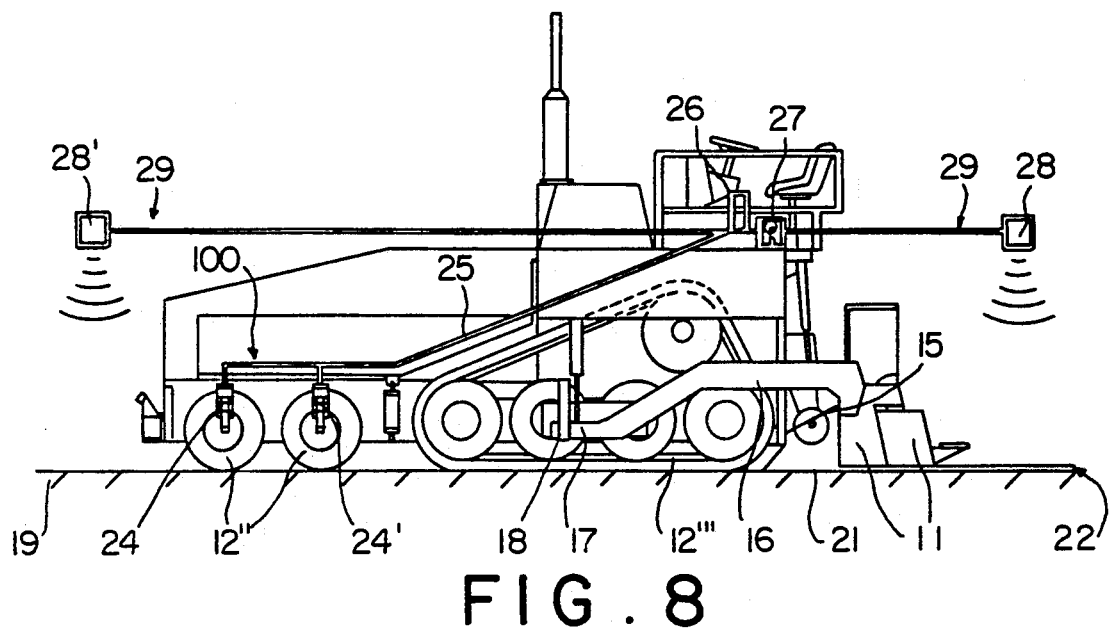
FIG. 8 shows another embodiment of this invention as applied to a two-steering-axle version of a combination crawler-and-steering-wheels mounted paver.

FIG. 8 shows a side view of another embodiment of this invention in which there are two front steering axles, one behind the other, providing a total of four (4) steering wheels (12") (each of which can assume the shape of a twin wheel). The steering mechanism and the steering geometry of a system of two or more steering axles, suitable for a road paver-finisher is described in detail in the ITALIAN Patent Application No. 21767-A/85.

The embodiment of this invention foresees that each steering wheel not only is mounted on a substantially vertial axis for steering purposes, but also is slidingly mounted on an substantially vertical axis to be pushed downwards or lifted upwards by an actuator in order to increase or reduce the share of the load to be carried by each wheel (12").

The two wheels (12") that lie approximately in the same vertical, lontitudinal plane are controlled by two actuators (24) and (24') that are hydraulically interconnected "in parallel arrangement" by means of the pipe (100).

Figure 1:
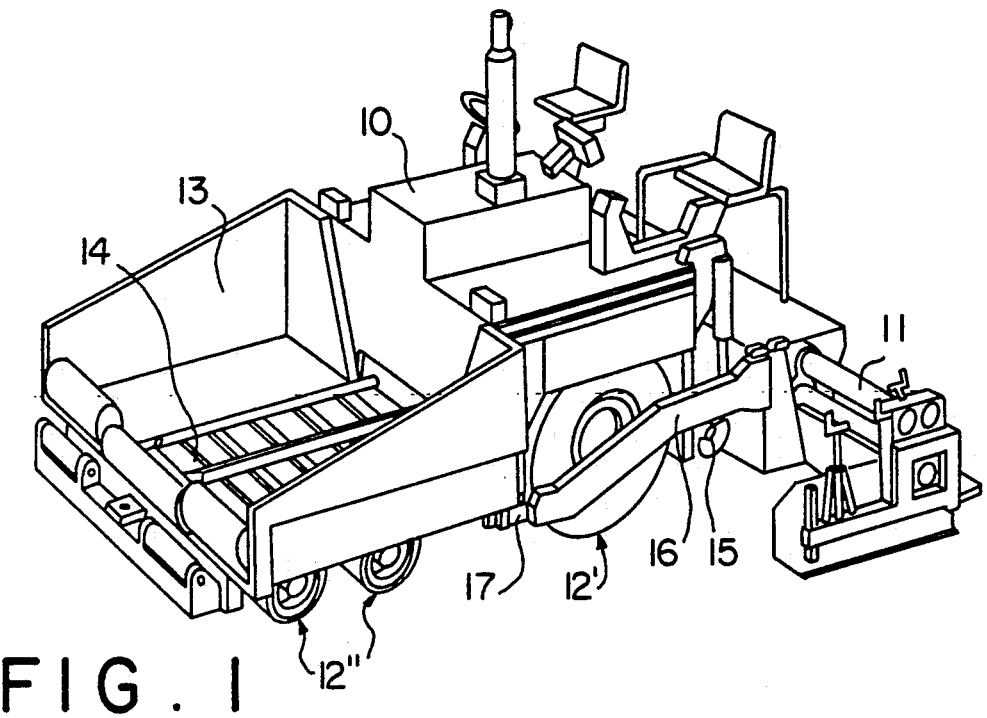
Figure 1A:
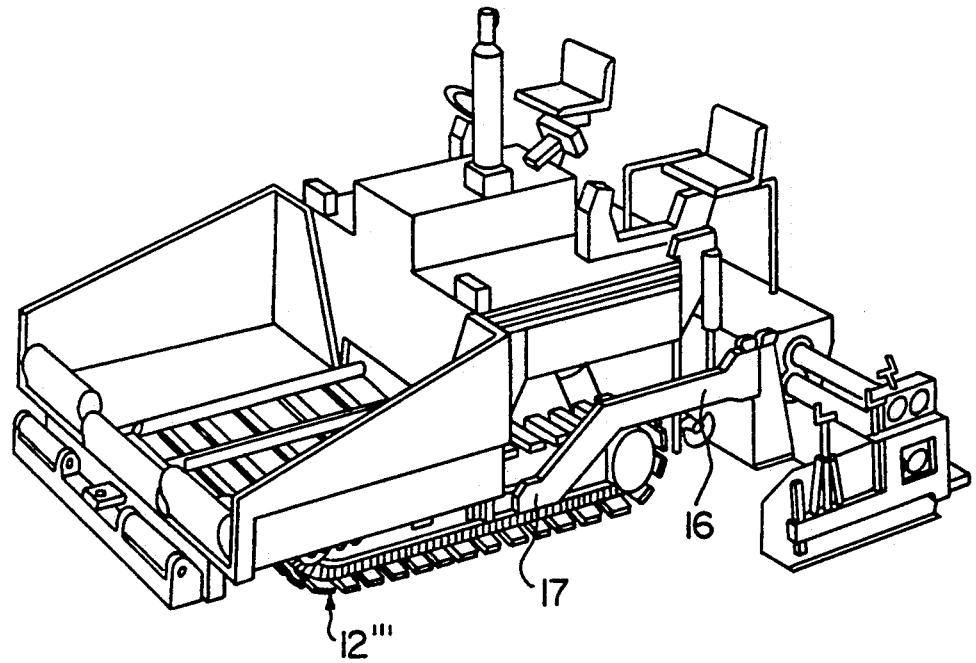
Figure 2:
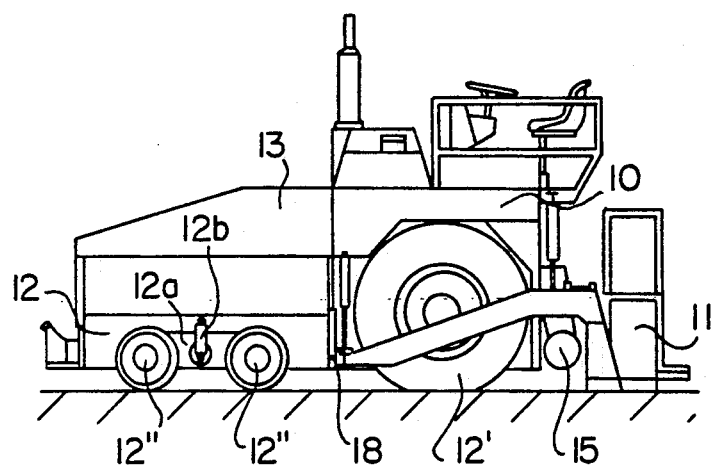
Figure 3:
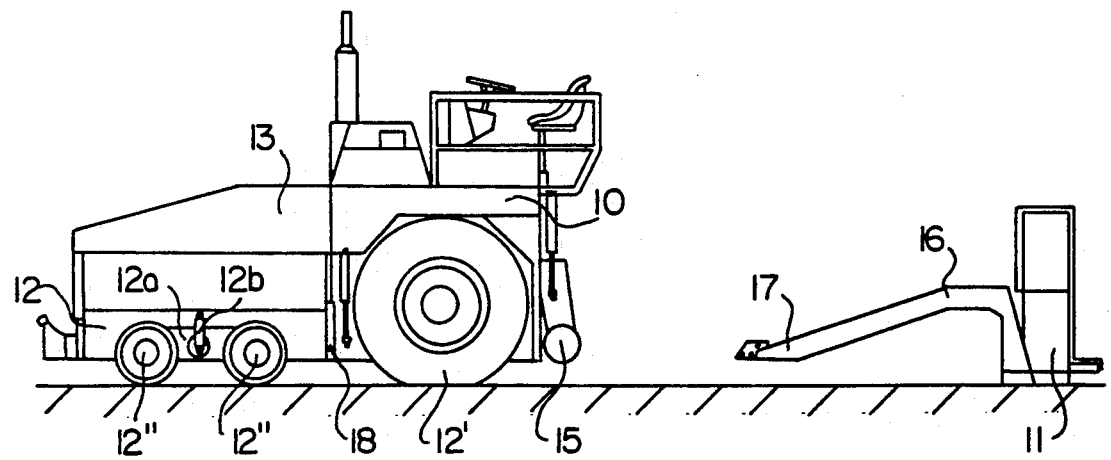

This parallel connection is the hydraulic equivalent of the mechanical "cantilever" mounting found on many traditional paver traction units (see FIGS. 2 and 3).

The hydraulic parallel arrangement has all the advantages of the "cantilever" mounting without its complexity, space consumption and cost.

Figure 9:
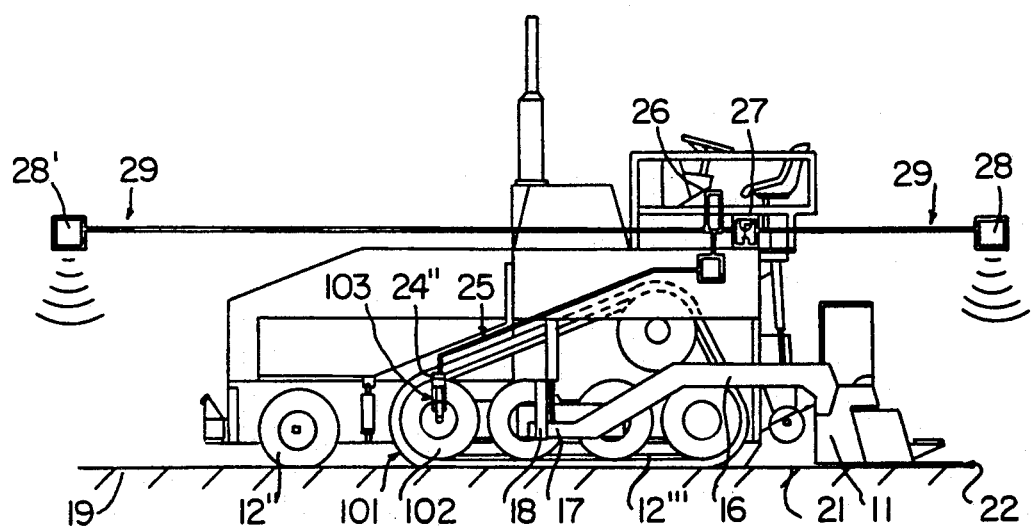
FIG. 9 shows another embodiment of this invention comprising a different device for controlling the load distribution and the longitudinal and transverse slope of the tractor unit.

FIG. 9 shows another embodiment of this invention which differs from the previous embodiments described in the FIGS. 7 and 8 because it is the front part (101) of the crawler unit (12''') that is mounted slidingly on the main frame (12) of the tractor unit (10) to be pushed downwards or lifted upwards by an actuator (24'').

As an example of an embodiment of this invention, in FIG. 9 the vertically sliding motion of the front part (101) of the crawler unit (12") is obtained by simply mounting the front stretcher-wheel (102) on a substantially vertical sliding guide (103) which is co-axial with the cylinder of the actuator (24").

In the present invention, the actuator (24") is connected by means of the hydraulic circuit (25) to all the control devices described in the embodiments of the preceding FIGS. 7, 7a, 7b and 8 and enables the control of the load distribution on the ground (19) and the accurate control of the transverse and longitudinal slope angle of the tractor unit (10).

Figure 10:
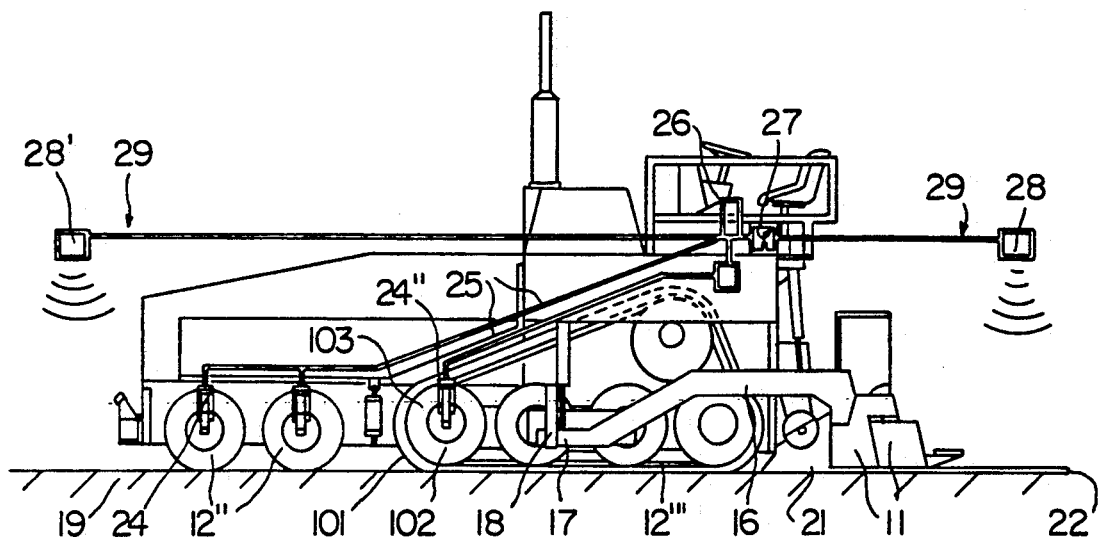
FIG. 10 shows a more complete embodiment of the present invention.

FIG. 10 shows the combination of the devices described in the preceding FIGS. 7, 8 and 9, according to this invention in which the comparator (29) contained in box (31) includes a more complex logic for operating all six actuators (24), (24') and (24") (three on each side of the machine) and for taking into consideration all data coming in from the pendulum (27) and the sensors (28) and (28').

Figure 11:
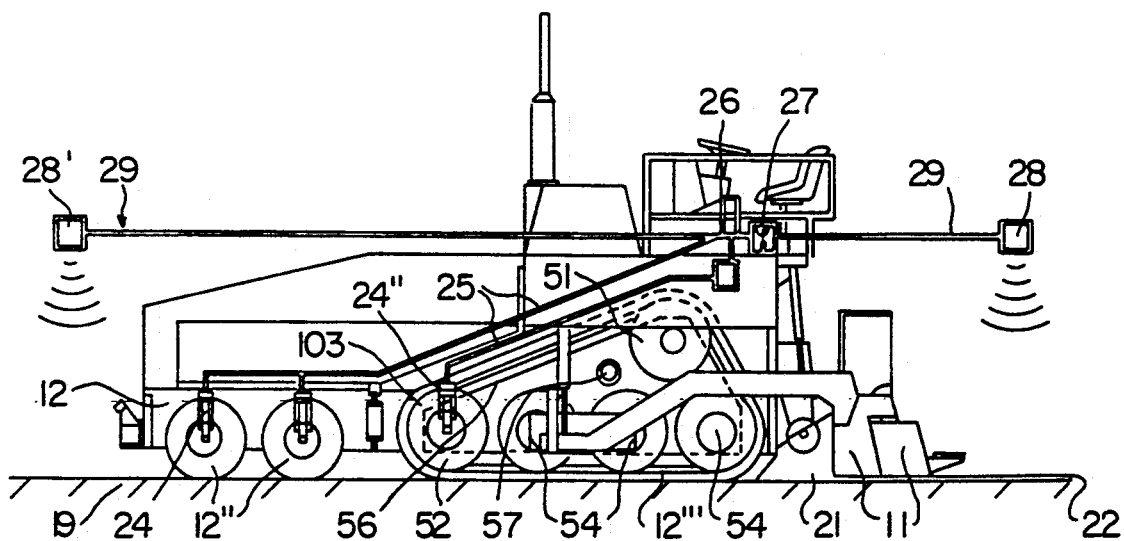
FIG. 11 shows another form of the invention.

FIG. 11 shows schematically portions of another form of the invention. In a paver shown in FIG. 11, the crawler unit (12''') has its stretcher wheel (52) and supporting wheels (54) mounted on a beam (56) which is pivotable about a horizontal axis relative to frame (12) of the tractor unit (10) at pivot point (57). This permits the crawler unit to better conform to the contour of the ground.

We claim:

1. A road paver-finisher comprising a tractor unit, a screed unit mounted for vertical movement on and relative to the tractor unit, the tractor unit having a hopper for road material, and conveyor means for unloading the road material from the hopper in front of the screed to be leveled by the screed, crawler belts mounted on the tractor unit forwardly of the screed for advancing the tractor unit, ground engaging steering wheels mounted on the tractor unit forwardly of the crawler belts, and power means for moving said steering wheels and crawler belts vertically relative to each other thereby to control tilting of the tractor unit and hence of the screed.

2. A road paver-finisher as claimed in claim 1, in which said power means move said steering wheels vertically relative to said crawler belts.

3. A road paver-finisher as claimed in claim 1, wherein said power means move said crawler belts vertically relative to said steering wheels.

4. A road paver-finished as claimed in claim 1, wherein said power means are hydraulic rams driven and controlled by a hydraulic circuit.

5. A road paver-finisher as claimed in claim 1, and distance measuring sensors to measure the contours of the ground and to control said power means.

6. A road paver-finisher as claimed in claim 1, said wheels being disposed in the same vertical longitudinal planes as the crawler belts.

7. A road paver-finisher as claimed in claim 1, said screed being mounted on said tractor unit for vertical swinging movement relative to the tractor unit about an axis disposed intermediate the screed and the steering wheels.

* * * * *